US006775009B2

(12) United States Patent
Hill

(10) Patent No.: US 6,775,009 B2
(45) Date of Patent: Aug. 10, 2004

(54) DIFFERENTIAL INTERFEROMETRIC SCANNING NEAR-FIELD CONFOCAL MICROSCOPY

(75) Inventor: Henry A. Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 335 days.

(21) Appl. No.: 09/917,276

(22) Filed: Jul. 27, 2001

(65) Prior Publication Data

US 2002/0033953 A1 Mar. 21, 2002

Related U.S. Application Data

(60) Provisional application No. 60/221,295, filed on Jul. 27, 2000.

(51) Int. Cl.[7] .............................................. G01B 11/02
(52) U.S. Cl. ...................................... 356/516; 356/511
(58) Field of Search ................................ 356/489, 495, 356/512, 516

(56) References Cited

U.S. PATENT DOCUMENTS

| 4,659,429 A | 4/1987 | Isaacson et al. |
| 4,681,451 A | 7/1987 | Guerra et al. |
| 5,004,307 A | 4/1991 | Kino et al. |

(List continued on next page.)

FOREIGN PATENT DOCUMENTS

| EP | 0 409 468 A2 | 1/1991 |
| EP | 0 491 289 | 12/1992 |
| EP | 0 757 271 A2 | 2/1997 |
| JP | 5-73980 | 5/1993 |
| JP | 5-174410 | 5/1993 |
| WO | WO99/63300 | 12/1999 |

OTHER PUBLICATIONS

Bauer et al., "Magnetic Domain Imaging with a Scanning Near–Field Optical Microscope Using a Modified Sagnac Interferometer," *Journal of Microscopy*, 194:2/3:507–511, May/Jun. 1999.

Courjon et al., "New Optical Near Field Developments: Some Perspectives in Interferometry," *Ultramicroscopy*, 61:117–125, 1995.

(List continued on next page.)

Primary Examiner—Robert H. Kim
Assistant Examiner—Thomas R Artman
(74) Attorney, Agent, or Firm—Fish & Richardson P.C.

(57) ABSTRACT

An interferometric optical microscopy system for imaging an object, the system including: a measurement beam mask array having an array of aperture pairs positioned to receive radiation emitted from the object in response to a measurement beam, radiation emerging from the array of aperture pairs defining a measurement return beam; a reference beam source array positioned to receive a reference beam, the reference beam source array comprising an array of elements each configured to radiate a portion of the reference beam, the radiated reference beam portions defining a reference return beam; and imaging optics positioned to direct the measurement and reference return beams to the photodetector and configured to produce overlapping conjugate images of the array of reference elements and the array of apertures pairs, wherein the conjugate image for each aperture pair overlaps with the conjugate image of a corresponding reference element, wherein the imaging optics include a pinhole array positioned in the conjugate image plane, the pinhole array having an array of pinholes each aligned with a corresponding aperture pair image, and wherein the measurement and reference beams are derived from a common source.

36 Claims, 7 Drawing Sheets

U.S. PATENT DOCUMENTS

| | | | |
|---|---|---|---|
| 5,105,403 A | | 4/1992 | Kando et al. |
| 5,105,408 A | | 4/1992 | Lee et al. |
| 5,121,256 A | | 6/1992 | Corle et al. |
| 5,125,750 A | | 6/1992 | Corle et al. |
| 5,150,338 A | | 9/1992 | Birecki et al. |
| 5,214,630 A | | 5/1993 | Goto et al. |
| 5,349,443 A | | 9/1994 | Guerra |
| 5,371,588 A | | 12/1994 | Davis et al. |
| 5,442,443 A | | 8/1995 | Guerra |
| 5,497,359 A | | 3/1996 | Mamin et al. |
| 5,602,643 A | * | 2/1997 | Barrett ........................ 356/495 |
| 5,602,819 A | | 2/1997 | Inagaki et al. |
| 5,602,820 A | | 2/1997 | Wickramasinghe et al. |
| 5,666,197 A | | 9/1997 | Guerra |
| 5,689,480 A | | 11/1997 | Kino |
| 5,737,084 A | * | 4/1998 | Ishihara ....................... 356/609 |
| 5,739,527 A | | 4/1998 | Hecht et al. |
| 5,760,901 A | | 6/1998 | Hill |
| 5,789,734 A | | 8/1998 | Torigoe et al. |
| 5,834,767 A | | 11/1998 | Hasegawa et al. |
| 5,883,872 A | | 3/1999 | Kino |
| 6,249,352 B1 | * | 6/2001 | Davies et al. ................ 356/512 |
| 2002/0021451 A1 | * | 2/2002 | Hill ............................. 356/511 |
| 2002/0033952 A1 | * | 3/2002 | Hill ............................. 356/512 |

OTHER PUBLICATIONS

Pilevar et al., "Reflection Near–field Scanning Optical Microscopy: an Interferometric Approach," *Ultramicroscopy*, 61:233–236, 1995.

Pohl et al., "Near–field Optics: Light for the World of NANO," *J. Vac. Sci. Technol. B*, 12:3:1441–1446, May/Jun. 1994.

Vaez–Iravani et al., "Phase Contrast and Amplitude Pseudoheterodyne Interference Near Field Scanning Optical Microscopy," *Appl. Phys. Lett.* 62:10:1044–1046, Mar. 8, 1993.

Fischer, "Optical Characteristics of 0.1 µm Circular Apertures in a Metal Film as Light Sources for Scanning Ultramicroscopy," *J. Vac. Sci. Technol. B* 3:1:386–390, Jan./Feb. 1985.

Fischer et al., "Near–Field Optical ScanningMicroscopy and Enhanced Spectroscopy with Submicron Apertures," *Scanning Microscopy Supplement*, 1:47–52, 1987.

Durig et al., "Near–Field Optical–Scanning Microscopy," *J. Appl. Phys.* 59:10:3318–3327, May 15, 1986.

Meixner et. al., "Direct Measurement of Standing Evanescent Waves with a Photon–Scanning Tunneling Microscope," *Applied Optics*, 33:34:7995–8000, Dec. 1, 1994.

Bainier et al., "Evanescent Interferometry by Scanning Optical Tunneling Detection," *J.Opt.Soc.Am.A*, 13:2:267–275, Feb. 1996.

Guerra, "Photon Tunneling Microscopy," *Applied Optics*, 29:26:3741–3752, Sep. 10, 1990.

\* cited by examiner

DIFFERENTIAL INTERFEROMETRIC SCANNING NEAR-FIELD CONFOCAL MICROSCOPY

CROSS-REFERENCE TO RELATED APPLICATIONS

This application claims priority from provisional application Serial No. 60/221,295 by Henry A. Hill filed Jul. 27, 2000 entitled "Differential Interferometric Confocal Near-Field Microscopy," the contents of which is incorporated herein by reference.

BACKGROUND

This invention is related to optical imaging and metrology of semiconductor, data-storage, and biological materials, structures, and devices.

Practical optical data-retrieval devices employing moving media rely upon efficient and accurate detection of optical inhomogeneities representing patterns of binary bits. These bits may be encoded, for example, in optically discernable variations of topography, reflectivity, absorption or transmission.

SUMMARY OF INVENTION

The invention features systems and methods for near-field, interferometric microscopy in which a differential detection technique is used to investigate the profile of a sample, to read optical date from a sample, and/or write optical date to a sample. The systems may operate in either reflective or transmissive modes.

In general, in one aspect, the invention features an interferometric optical microscopy system for imaging an object. The system includes: (i) a measurement beam mask array having an array of aperture pairs positioned to receive radiation emitted from the object in response to a measurement beam, radiation emerging from the array of aperture pairs defining a measurement return beam; (ii) a reference beam source array positioned to receive a reference beam, the reference beam source array including an array of elements each configured to radiate a portion of the reference beam, the radiated reference beam portions defining a reference return beam; and (iii) imaging optics positioned to direct the measurement and reference return beams to the photo-detector and configured to produce overlapping conjugate images of the array of reference elements and the array of apertures pairs. The conjugate image for each aperture pair overlaps with the conjugate image of a corresponding reference element. Furthermore, the imaging optics include a pinhole array positioned in the conjugate image plane, the pinhole array having an array of pinholes each aligned with a corresponding aperture pair image. Finally, the measurement and reference beams are derived from a common source.

Embodiments of the system may include any of the following features.

Each pinhole in the pinhole array may be sized to pass only a central portion of each corresponding aperture pair image.

The system may further include a source for the measurement and reference beams. The source may be configured to direct the measurement beam to the measurement beam mask array, and each aperture in the measurement beam mask array is configured to radiate a portion of the measurement to the object to cause the object to emit the radiation. The measurement beam may contact the mask array at normal incidence. Alternatively, the source directs the measurement beam to contact the measurement mask array at an angle to a normal to the mask array, thereby introducing a phase shift between the measurement beam portions radiated to the object by the apertures in each aperture pair. Furthermore, the system may be implemented in a transmissive mode, in which case the measurement beam mask array is used only to collect radiation emitted from the object, and the system further includes a measurement beam source array positioned to receive the measurement beam. The measurement beam source array has an array of source aperture pairs positioned to radiate portions of the measurement beam to the object to cause the object to emit the radiation. The measurement beam may contact the measurement beam source array at normal incidence. Alternatively, the source directs the measurement beam to contact the measurement beam source array at an angle to a normal to the mask array, thereby introducing a phase shift between the measurement beam portions radiated to the object by the apertures in each aperture source pair.

The system may further include a multi-element photo-detector positioned to measure the radiation emerging through each pinhole. The radiation emerging through each pinhole provides an interference signal indicative of a differential property between object locations corresponding to the apertures in each aperture pair. The system may further include an electronic controller coupled to the photo-detector and configured to resolve the differential property across multiple regions of the object based on signals from the photo-detector.

In general, in another aspect, the invention features a differential microscopy system for imaging an object. The system includes a mask including an array of aperture pairs, each aperture pair having a common separation and an imaging system. During operation the mask is positioned adjacent the object to receive radiation emitted from the object. The imaging system is configured to image radiation emerging from the array of aperture pairs to produce a first conjugate image of the emerging radiation and an overlapping, second conjugate image of the emerging radiation laterally displaced relative to the first conjugate image by an amount corresponding to the aperture pair separation and a magnification of the imaging system. A superposition of the first and second conjugate images define a set of aperture pair images each corresponding to a different one of the aperture pairs. The superposition suppresses a contribution to each aperture image of a selected component of the radiation emerging from each corresponding aperture pair.

Embodiments of the system may include any of the following features.

The selected component may be an anti-symmetric component of the radiation emerging from each corresponding aperture pair.

The imaging system may be further configured to impart a selected phase shift between the first and second conjugate images, and the selected component corresponds to the selected phase shift. For example, when the selected phase shift is $\pi$ (modulo $2\pi$), the selected component is a symmetric component of the radiation emerging from each corresponding aperture pair. Additional values of the phase shift will cause the selected component to be a superposition of symmetric and anti-symmetric components of the radiation emerging from each corresponding aperture pair.

The imaging system may include an interferometer for separating and recombining the radiation emerging through the multiple sets of aperture pairs into portions that produce the first and second conjugate images. The imaging system may further include two collimating lenses defining a microscope and the interferometer may be positioned within the microscope. The interferometer may be configured to recombine the portions that produce the first and second conjugate images within the microscope and introduce a difference in propagation directions between the recombined portions. In such a case, the difference in propagation directions produces the lateral displacement between the first and second conjugate images. The interferometer may further be configured to introduce a relative phase shift between the recombined portions, and wherein the selected component is a superposition of symmetric and anti-symmetric components, the superposition being based on the relative phase shift.

Alternatively, for example, the imaging system may include a prism positioned at a pupil plane of the imaging system. The prism is positioned to contact a first portion of the imaged radiation, and not a second portion of the imaged radiation. The prism introduces a difference in propagation between the first and second portions to produce the laterally displaced first and second conjugate images. The imaging system may include two collimating lenses defining a microscope and the pupil plane may be positioned within the microscope. The prism may be further configured to introduce a relative phase shift between the first and second portions to cause the selected component to be a superposition of symmetric and anti-symmetric components.

The imaging system may further includes a pinhole array positioned in the conjugate image plane, the pinhole array having an array of pinholes each aligned with a corresponding aperture pair image. Each pinhole in the pinhole array may be sized to pass only a central portion of each corresponding aperture pair image.

In general, in another aspect, the invention features a differential microscopy system for imaging an object. The system includes a mask including an array of aperture pairs and an imaging system. During operation the mask is positioned adjacent the object to receive radiation emitted from the object. The imaging system is configured to image radiation emerging from the multiple sets of aperture pairs and produce a conjugate image of the emerging radiation. The conjugate image includes an array of aperture pair images each corresponding to a different one of the aperture pairs. The imaging system includes a pinhole array positioned in the conjugate image plane, the pinhole array having an array of pinholes each aligned with a corresponding aperture pair image. The imaging system furthers includes a wave front modifier positioned in a pupil plane of the imaging system. The wave front modifier causes the conjugate image to suppress a selected component of the radiation emerging from each aperture pair from passing through the corresponding pinhole in the conjugate image plane.

Embodiments of the system may further include any of the following features.

Each pinhole in the pinhole array may be sized to pass only a central portion of each corresponding aperture pair image.

The selected component may be a symmetric component of the radiation emerging from each corresponding aperture pair. Furthermore, the selected component may be a superposition of symmetric and anti-symmetric components of the radiation emerging from each corresponding aperture pair.

The wave front modifier may be a phase mask that imparts one or more phase shifts to different regions of the incident radiation. The phase mask may impart a constant phase shift to the different regions of the incident radiation. For example, the phase mask may impart a phase shift of $\pi$ (modulo $2\pi$) to half of the incident radiation relative to the other half of the incident radiation. As a result, the selected component may be a symmetric component of the radiation emerging from each corresponding aperture pair. In one particular example, the phase mask may be defined by a retardation plate positioned to bisect the radiation in the pupil plane, wherein the retardation plate has a thickness that imparts a constant $\pi$ (modulo $2\pi$) phase-shift relative to a similar thickness of air. Alternatively, the phase mask may impart a phase shift of $\pi$ (modulo $2\pi$) to alternating periodic regions of the incident radiation. Furthermore, in additional embodiments, the phase mask may impart a linear phase ramp to one ore more selected portions of the incident radiation. Such a phase mask may be defined by a prism positioned to contact one-half of the radiation in the pupil plane and not the other half of the radiation in the pupil plane.

The imaging system may include two collimating lenses defining a microscope and the pupil plane may be positioned within the microscope.

In additional aspects, the invention features microscopy methods corresponding to the systems described above.

Confocal and near-field confocal, microscopy systems are also described in the following, commonly-owed provisional applications: Ser. No. 09/631,230 filed Aug. 2, 2000 by Henry A. Hill entitled "Scanning Interferometric Near-Field Confocal Microscopy," and the corresponding PCT Publication WO 01/09662 A2 published Feb. 8, 2001; Provisional Application Serial No. 60/221,019 filed Jul. 27, 2000 by Henry A. Hill and Kyle B. Ferrio entitled "Multiple-Source Arrays For Confocal And Near-Field Microscopy" and the corresponding Utility application Ser. No. 09/917, 402 having the same title filed on Jul. 27, 2001; Provisional Application Serial No. 60/221,086 filed Jul. 27, 2000 by Henry A. Hill entitled "Scanning Interferometric Near-Field Confocal Microscopy with Background Amplitude Reduction and Compensation" and the corresponding Utility application Ser. No. 09/917,399 having the same title filed on Jul. 27, 2001; Provisional Application Serial No. 60/221,091 filed Jul. 27, 2000 by Henry A. Hill entitled "Multiple-Source Arrays with Optical Transmission Enhanced by Resonant Cavities and the corresponding Utility application Ser. No. 09/917,400 having the same title filed on Jul. 27, 2001; and Provisional Application Serial No. 60,221,086 filed Jul. 27, 2000 by Henry A. Hill entitled "Control of Position and Orientation of Sub-Wavelength Aperture Array in Near-Field Microscopy" and the corresponding Utility application Ser. No. 09/917,401 having the same title filed on Jul. 27, 2001; the contents of each of the preceding applications being incorporated herein by reference. Aspects and features disclosed in the preceding provisional applications may be incorporated into the embodiments described in the present application.

In preferred embodiments, the near-field scanning probe is typically a sub-wavelength aperture positioned in close proximity to a sample; in this way, sub-wavelength spatial resolution in the object-plane is obtained. An aperture smaller than a free space optical wavelength of an optical beam used in a near-field microscopy application is hereinafter referred to as a sub-wavelength aperture.

Embodiments of the invention may have any of the following advantages.

One advantage is sub-wavelength spatial resolution of a quasi-two-dimensional sample, e.g. an optical data-storage medium.

Another advantage is phase-sensitive detection of the complex scattering amplitude of a quasi-two-dimensional sample.

Another advantage is efficient optical throughput achieved by the use of a waveguiding near-field probe which supports two propagating modes at the operating optical wavelength.

Another advantage is detection of small changes in optical properties of a sample, using a sensitive differencing modality of the present invention.

Another advantage is spatially parallel and simultaneous operation achieved by the use of a plurality of wave guiding near-field probes, each of which supports two propagating modes at the operating optical wavelength.

Another advantage is a high degree of insensitivity to background scattered light.

Another advantage is an higher signal-to-noise ratio than may be obtained with a non-interferometric confocal microscope.

Another advantage is insensitivity to variations in total optical intensity and other environmental conditions external to a sample.

Another advantage is a larger measurement bandwidth and faster scanning than may be obtained with a non-interferometric scanning confocal microscope.

Another advantage is operation with low-contrast samples.

Another advantage is increased data-storage density in high-contrast media, by application of counting systems of radix larger than two.

Another advantage is a discrete-time method for making a determination of both the real and imaginary components of complex scattering amplitudes.

Another advantage is a discrete-time method for making a determination of both the magnitude and phase of complex scattering amplitudes.

Other aspects, features, and advantages follow.

BRIEF DESCRIPTION OF THE DRAWINGS

In the drawings, wherein like reference characters denote similar elements throughout the several views.

DETAILED DESCRIPTION OF THE INVENTION

Embodiments of the present invention comprise scanning differential interferometric near-field confocal microscopes operating in either a reflection or transmission mode with a reduction of effects of background beams and a corresponding reduction in statistical errors. The embodiments further comprise transmission of an optical beam through arrays of wavelength and sub-wavelength apertures which employ apertures smaller than a free space optical wavelength of an optical beam used in the near-field microscopy. The sub-wavelength apertures are hereinafter referred to as sub-wavelength apertures.

While the apparatus of the present invention has application for a wide range of radiation sources, the following description is taken, by way of example, with respect to an optical measuring system in which the incident beam is a beam of electromagnetic radiation, e.g., an optical beam. In further embodiments, for example, the beam incident on the aperture or arrays of apertures can include an acoustic beam, an electron beam, and an atomic beam.

The source of optical beams used by embodiments of the present invention include CW and pulsed sources in different combinations with single and multiple wavelength sources.

Also, while the apparatus of the present invention has application for a wide range of imaging systems, the following description is taken, by way of example, with respect to interferometric confocal near-field microscopy measuring systems. Optical cavities as used herein includes, but is not limited to, use in scanning and step-and-repeat interferometric near-field confocal microscopy systems and scanning and step-and-repeat confocal and interferometric confocal microscopy systems.

Figure 1:
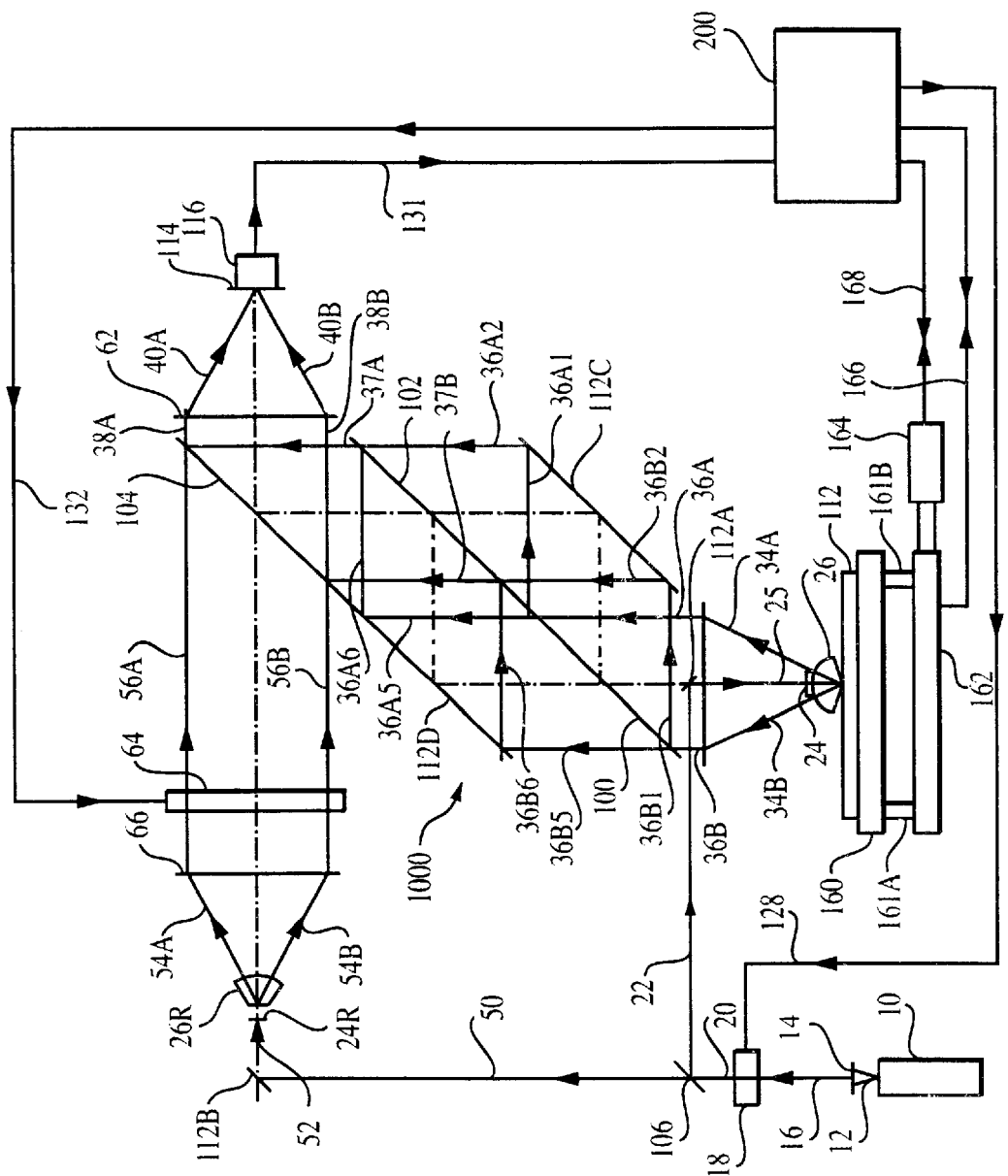
FIG. 1 illustrates, in schematic form, the first embodiment of the present invention.

Referring to the drawings in detail, FIG. 1 depicts in schematic form the first embodiment of the present invention. As shown in FIG. 1, the first embodiment comprises an interferometer, a source 10, object material 112, object material chuck 160, chuck stage 162, translator 164, detector 116, and reference object 26R. The configuration of the interferometer is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1 without departing from the spirit and scope of the present invention. Other forms of scanning interferometric near-field confocal microscopes as described in the previously mentioned Provisional Patent Applications filed Jul. 27, 2000 and entitled "Scanning Interferometric Near-field Confocal Microscopy," "Multiple-Source Arrays With Optical Transmission Enhanced By Resonant Cavities," and "Scanning Interferometric Near-Field Confocal Microscopy With Background Amplitude Reduction And Compensation" by Henry A. Hill, the contents of which are incorporated herein by reference, may be incorporated into apparatus of FIG. 1 without departing from the spirit and scope of the present invention.

Light source 10 such as a laser can be any of a variety of lasers. For example, the laser can be a gas laser, e.g., a HeNe laser, stabilized in any of a variety of conventional techniques known to those skilled in the art, see for example, T. Baer et al., "Frequency Stabilization of a 0.633 μm He—Ne-longitudinal Zeeman Laser," *Applied Optics*, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters*, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, QE-19, 1514–1519 (1983).

For certain of the embodiments disclosed herein, light sources corresponding light source 10 may also be a pulsed source. There are several different procedures for producing a pulsed source [see Chapter 11 entitled "Lasers", *Handbook of Optics*, 1, 1995 (McGraw-Hill, New York) by W. Silfvast]. There will be a restriction on the pulse width. The restriction on the pulse width is based on a consideration of the spatial resolution required for a scanning end-use application and/or enhancement properties of the first embodiment as subsequently described.

For the first embodiment, light source 10 is preferably a monochromatic point source or a spatially incoherent source of radiation across surface of the source, preferably a laser or like source of coherent or partially coherent radiation, and preferably polarized. Light source 10 emits input beam 12. As shown in FIG. 1, input beam 12 enters collimating lens 14 to form input beam 16. Input beam 16 is transmitted by a phase retardation plate 18 as input beam 20. The plane of polarization of input beam 20 is rotated by phase retardation plate 18 to be either parallel or orthogonal to the plane of FIG. 1. However, other orientations of the plane of polarization of input beam 20 may be beneficially used in certain end-use applications. The function of phase retardation plate 18 is controlled by signal 128 from electronic controller, signal processor, and computer 200.

Input beam 20 is incident on a non-polarizing beam splitter 106 and a first portion thereof is reflected as a measurement beam 22. A second portion of input beam 20 incident on beam splitter 106 is transmitted as reference beam 50. Measurement beam 22 is reflected by mirror 112A as measurement beam 25 and incident on a lens assembly comprising lenses 24 and 26.

Figure 4A:
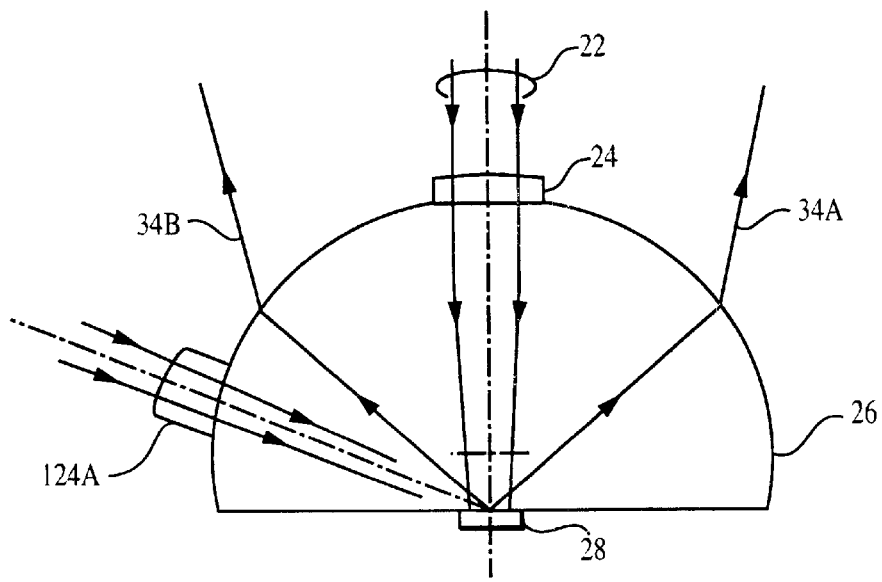
FIG. 4a illustrates, in schematic form, the lens assembly comprising Amici type objective lens 26 and lens 24, as used in the first embodiment, and the lens assembly comprising Amici type objective lens 26 and lens 124, as used in the second embodiment.

The propagation of measurement beam 25 through the lens assembly is shown schematically in an expanded form in FIG. 4a. Lens 26 is an Amici type objective lens. Measurement beam 25 is focused by the lens assembly to a beam diameter at element 28 that encompasses an array of at least one pair of sub-wavelength apertures in element 28. Element 28 shown schematically in FIG. 4b in an expanded form is a conducting layer on a surface of Amici type objective lens 26.

Figure 4B:
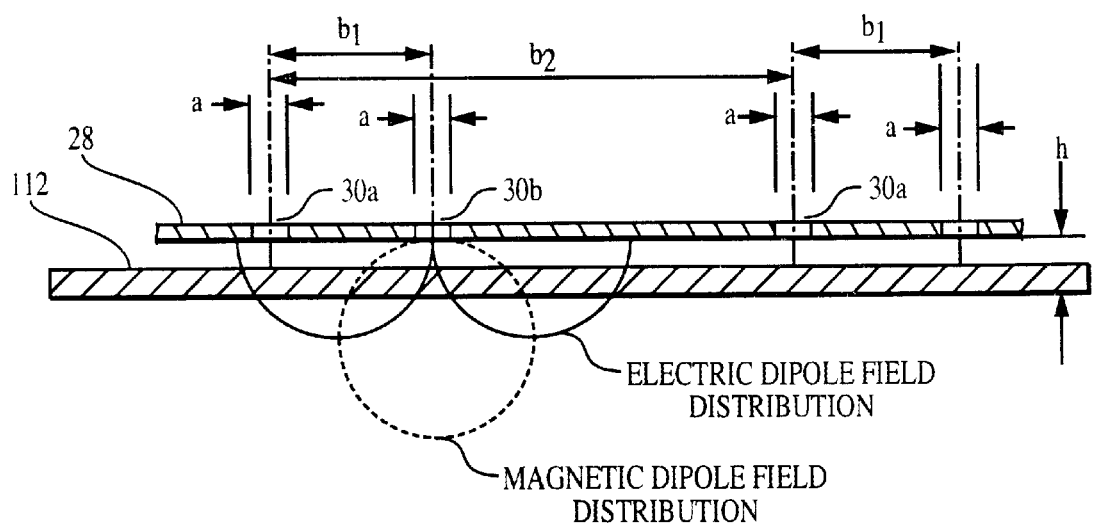
FIG. 4b illustrates, in schematic form, conducting element 28 in relation to object material 112 being profiled/imaged and angular distribution functions of electric far field field components associated with an electric dipole and a magnetic dipole located at a sub-wavelength aperture 30.

The sub-wavelength apertures are elements 30a and 30b as indicated in FIG. 4b. The diameter of elements 30a and 30b is $\alpha$ with $\alpha<\lambda$, preferably $\alpha<<\lambda$, where $\lambda$ is the wavelength of measurement beam 22. The separation of elements 30a and 30b is $b_1$ with $b_1 \cong 2\alpha$. The separation of adjacent pairs of elements 30a and 30b is $b_2$, preferably $b_2>>b_1$. The thickness of conducting material of element 28 is of the order of 20 nm and chosen so that the fraction of the probe beam transmitted by sections of element 28 not containing sub-wavelength elements 30a and 30b is <<1.

The relative spacings $b_1$ and $b_2$ in element 28 are further selected to minimize the effect of one sub-wavelength aperture on the transmission properties a second sub-wavelength aperture. A coupling leading to either an enhancement or a reduction of transmission by an array of sub-wavelength apertures will complicate interpretation of results obtained with the apparatus of the first embodiment.

The diameters of sub-wavelength apertures 30a need not be restricted to a single diameter as shown schematically in FIG. 4b but may beneficially comprise two or more diameters for an end-use application as long as the diameters of corresponding pairs of sub-wavelength apertures are the same. Further, the shapes of sub-wavelength apertures 30a may comprise shapes other than circular, e.g., squares or rectangles as long as the shapes of corresponding pairs of sub-wavelength apertures are the same without departing from the spirit and scope of the present invention.

The spacing $b_2$ need not be restricted to a single value as shown schematically in FIG. 4b but may beneficially comprise two or more different values for an end-use application without departing from the spirit and scope of the present invention.

Further, the arrangement of sub-wavelength apertures 30a may be arranged in various geometric patterns or a random pattern as long as the vectors representing the displacements of sub-wavelength apertures 30b from associated sub-wavelength apertures 30a are parallel without departing from the spirit and scope of the present invention.

The apertures 30 in element 28 can be formed as holes in a mask or as transmissive dielectric regions in an otherwise non-transmissive mask, e.g., transmissive vias in an otherwise reflective element. Moreover, the dielectric material in element 28 defining the apertures 30 can form a waveguide or optical cavity that enhances the transmission of the near-field probe beam to the sample. See, e.g., the previously cited application "Multiple-Source Arrays For Confocal And Near-Field Microscopy." Furthermore, in the presently described embodiment, the mask portion of element 28 is described as conducting to indicate that it is reflective. In other embodiments, element 28 is not necessarily conductive, but is, generally, not transmissive, with the coupling of the near-field probe beams to the sample being accomplished by the apertures 30 in element 28.

The sub-wavelength apertures may further comprise a Fresnel zone plate or a microlens to alter beneficially in certain end use applications the transmission through an array of sub-wavelength apertures without departing from the spirit and scope of the present invention. In certain other end use applications, gratings may be added to an array of sub-wavelength apertures operating as spatial filters of reflected/scattered or transmitted near-field probe beam(s) to alter properties of the reflected/scattered or transmitted near-field probe beam(s) without departing from the spirit and scope of the present invention.

A first portion of the measurement beam incident on sub-wavelength apertures 30a and 30b is transmitted as a near-field probe beam. A portion of the near-field probe beam is incident on object material 112 and a portion thereof is reflected and/or scattered back to the sub-wavelength apertures 30a and 30b, and a portion thereof is transmitted as a near-field return probe beam. The spatial separation of adjacent surfaces of object material 112 and conducting element 28 is h as indicated in FIG. 4b. The value of h is preferably of the order of 2a. A second portion of the measurement beam incident on sub-wavelength apertures 30a and 30b is reflected and/or scattered as a background return beam. The near-field return probe beam the background return beam return beam exit Amici type objective lens 26 as return beam 34 shown as rays 34A and 34B in FIGS. 1 and 4a wherein return beam 34 comprises rays between rays 34A and 34B. Return beam 34 is collimated by lens 60 as return beam 36 shown as rays 36A and 36B in FIG. 1a, wherein beam 36 comprise rays between rays 36A and 36B.

Reference beam 50 is reflected by mirror 112B, transmitted by lens 24R, incident on Amici type lens 26R, and transmitted as reference beam 54 shown as rays 54A and 54B in FIG. 1, wherein beam 54 comprises rays between rays 54A and 54B. Beam 54 is collimated by lens 66 and transmitted by phase shifter 64 as a transmitted reference beam 56 shown as rays 56A and 56B in FIG. 1, wherein beam 56 comprises rays in between rays 56A and 56B. Phase shifter 64 introduces a relative phase shift $\chi$ in the transmitted reference beam 56 as a result of the transit of reference beam 56 through phase shifter 64. The magnitude of phase shift $\chi$ is controlled by control signal 132 from electronic controller, signal processor, and computer 200.

Reference beam 52 is focused by lens 24R to a beam diameter at element 28R that encompasses an array of at least one sub-wavelength apertures in element 28R. Element 28R is shown schematically in FIG. 4d in an expanded form as an array of transmitting apertures 30R on a surface of Amici type objective lens 26R. Transmitting apertures 30R generate transmitted reference beam components of beam 54 that correspond to pairs of elements 30a and 30b of element 28R. The spacing of the transmitting apertures 30R and the focal length of lens 66 are chosen such that transmitting apertures 30R and element pairs 30a and 30b are conjugates as seen by a subsequent imaging onto a detector. The diameter a" of the transmitting apertures 30R is chosen to efficiently generate transmitted reference beam 56 with a diameter substantially the same as the diameter of return beam 37.

Beam 36 is incident on a Mach-Zehnder interferometer, generally indicated at element number 1000, and exits as beam return beam 37. Beam 37 is shown in FIG. 1 as rays 37A and 37B and comprises all rays between rays 37A and 37B. Beam 37 is incident on non-polarizing beam splitter 104 and a portion thereof is reflected as return beam component of beam 38 shown as rays 38A and 38B in FIG. 1, wherein beam 38 comprises rays between rays 38A and 38B.

Transmitted reference beam 56 is incident on beam splitter 104 and a portion thereof is transmitted as a transmitted reference beam component of beam 38. The planes of polarization of the return beam and transmitted reference beam components of beam 38 are parallel to the plane of FIG. 1 so that beam 38 is a mixed beam. Beam 38 is incident on lens 62 and focused as mixed beam 40 shown as rays 40A and 40B in FIG. 1, wherein mixed beam 40 comprises rays between rays 40A and 40B. Mixed beam 40 is focused onto a pinhole plane 114 such that a pinhole in image plane 114 is a conjugate image of a pair of sub-wavelength apertures 30a and 30b.

Figure 5A:
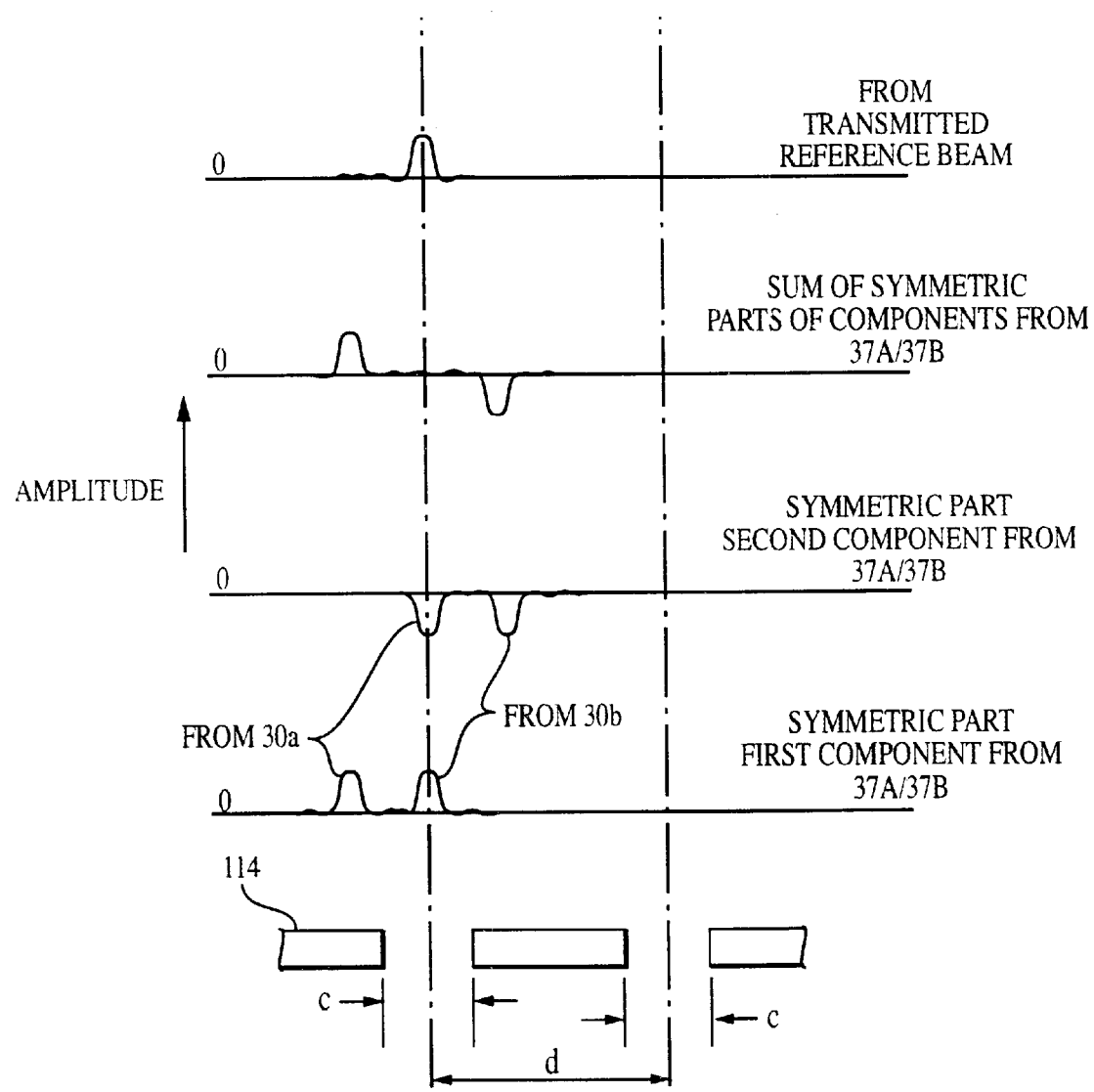
FIG. 5a illustrates, in schematic form, image plane 114 and amplitude distribution functions for symmetric components for images of a sub-wavelength apertures 30a and 30b at respective pinholes in image plane 114.

Pinhole plane 114 is shown schematically in FIG. 5a. The diameter of the pinholes is c and the spacing between the pinholes is d. The spacing d is equal to the separation $b_2$ of sub-wavelength apertures 30a times the magnification of the imaging system imaging the sub-wavelength aperture pairs 30a and 30b onto corresponding pinholes in pinhole plane 114. Diameter c is selected to be approximately twice the size of a diffraction limited image of a point object by the imaging system and the spacing d is selected to be larger than c, preferably $\geqq$ to approximately four times the size of a diffraction limited image of a point object by the imaging system.

A portion of mixed beam 40 is transmitted by the pinholes in pinhole plane 114 and detected by a detector 116, preferably by a quantum photon detector. Detector 116 comprises an array of pixels, comprising either a single pixel, a one dimensional array of pixels, or a two dimensional array of pixels according to the requirements of an end-use application, with a one-to-one mapping of pinholes in pinhole plane 114 to the pixels of detector 116. Detector 116 generates an electrical interference signal comprising an array of signal values $[S_n]$ corresponding to the array of pixels. Subscript n is an index indicating an element in the array of signal values $[S_n]$. The array of signal values $[S_n]$ may comprise a single element, a one-dimensional array of elements, or a two-dimensional array of elements depending on an end-use application.

The array of signal values $[S_n]$ may be written to a good approximation as $$[S_n] = [(S_D + S_I)_n] \tag{1}$$

where term $(S_D)$ represents non-interferometric cross terms and term $(S_I)_n$ represents interferometric cross terms.

A $(S_D)_n$ term is proportional to the sum of the squares of the amplitudes of the corresponding portions of the near-field return probe beam, of the background return beam, and of the transmitted reference beam and interferometric cross terms between complex amplitudes of the near-field return probe beam and of the background return beam. A $(S_I)_n$ term is proportional to the sum of the interferometric cross terms between complex amplitudes of the near-field return probe beam and of the transmitted reference beam and between complex amplitudes of the background return beam and of the transmitted reference beam.

Term $(S_D)_n$ is independent of phase shift $\chi$. Term $(S_I)_n$ is a sinusoidal function of phase shift $\chi$ and may be written as $$(S_I)_n = (|S_I| \cos(\phi + \chi))_n \tag{2}$$

where $(|S_I|)_n$ and $\phi$ are an amplitude and phase, respectively, related to the complex amplitudes contributing to $(S_I)_n$.

Operation of the apparatus of the first embodiment of the present invention depicted in FIGS. 1, 4a, and 4b is based on the acquisition of a sequence of four measurements of arrays of signal values. The sequence of the four arrays of signal values $[S_n]_1$, $[S_n]_2$, $[S_n]_3$, and $[S_n]_4$ is obtained by detector 116 with phase shifter 64 introducing a sequence of phase shifts $\chi_0$, $\chi_0+\pi$, $\chi_0+\pi/2$, and $\chi_0+3\pi/2$ radians, respectively, where $\chi_0$ is some fixed value of phase shift $\chi$. The four arrays of signal values $[S_n]_1$, $[S_n]_2$, $[S_n]_3$, and $[S_n]_4$ are sent to electronic controller, signal processor, and computer 200 as signal 131, in either digital or analog format, for subsequent processing.

Conventional conversion circuitry, i.e., analog-to-digital converters, is included in either detector 116 or electronic controller, signal processor, and computer 200 for converting the four arrays $[S_n]_1$, $[S_n]_2$, $[S_n]_3$, and $[S_n]_4$ to a digital format. Phase shift $\chi$ introduced by phase shifter 64 is controlled by signal 132 where signal 132 is generated and subsequently transmitted by electronic controller, signal processor, and computer 200. Phase shifter 64 can be of an electro-optical type.

Next, two arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200.

Elements of the arrays of signal value differences contain substantially and with relatively high efficiency only two interferometric cross terms, a first interference cross term between the complex amplitude of the near-field return probe beam and of the complex amplitude of the transmitted reference beam and a second interferometric cross term between the complex amplitude of the background return beam and of the complex amplitude of the transmitted reference beam.

The relatively high efficiency for isolation of effects of amplitudes of beams is controlled by the choice of parameters c and d.

The complex amplitude of the near-field return probe beam is computed by electronic controller, signal processor, and computer 200 from the amplitude of the first interferometric term between the complex amplitude of the near-field return probe beam and the amplitude of the transmitted reference beam. The computation comprises using measured values for the square of the amplitudes of the portions of the transmitted reference beam transmitted by the pinholes of pinhole plane 114 and detected by detector 116.

Next, the plane of polarization of input beam 20 is rotated by 90° by phase retardation element 18 in response to signal 128 from electronic controller, signal processor, and computer 200. A second set of four arrays of signal values $[S_n]_5$, $[S_n]_6$, $[S_n]_7$, and $[S_n]_8$ corresponding to measured arrays of signal values $[S_n]_1$, $[S_n]_2$, $[S_n]_3$, and $[S_n]_4$ are obtained by detector 116. Arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200. The complex amplitude of the near-field return probe beam for the orthogonally polarized input beam 20 is computed by electronic controller, signal processor, and computer 200 by the same algorithm as used to compute the complex amplitude of the near-field return probe beam for the non-rotated state of polarization of input beam 20.

Object material 112 is mounted on an object chuck 160. The angular orientation and height of object chuck 160 is controlled by three transducers, two of which are shown as 161A and 161B, that are attached to chuck stage 162. The angular orientation and height of object material 112 relative to the surface of conducting element 28 are detected and used to generate error signals. The detection and generation of error signals may be by known techniques in the art such as capacitive or "cap" gauges, precision distance measuring interferometry [see references subsequently cited with respect to tracking lateral displacements of chuck stage 162] including wave domain reflectometry [see commonly owned U.S patent application with Ser. No. 09/089,105 and entitled "Methods And Apparatus For Confocal Interference Microscopy Using Wavenumber Domain Reflectometry And Backgroung Amplitude Reduction And Compensation" by Henry A. Hill] and scanning interferometric near-field microscopy. The error signals are transmitted as a component of signal 166 to electronic controller, signal processor, and computer 200. Servo control signals are generated by electronic controller, signal processor, and computer 200 from the error signals and transmitted as a servo control signal component of signal 166 to chuck stage 162. Transducers 161A, 161B, and the third transducer (not shown) alter the orientation and/or height of object material 112 according to the servo control signal component of signal 166.

The location of chuck stage 162 in a plane substantially parallel to the surface of conducting element 28 is controlled by translator 164. The location of chuck stage 162 is detected by known techniques in the art such as precision distance measuring interferometry and error signals transmitted as an error signal component of signal 168 to electronic controller, signal processor, and computer 200. [See U.S. patent application with Ser. No. 09/252,266 entitled "Interferometer And Method For Measuring The Refractive Index And Optical Path Length Effects Air" by Peter de Groot, Henry A. Hill, and Frank C. Demarest filed Feb. 18, 1999 and U.S. patent application with Ser. No. 09/252,266 entitled "Apparatus And Method For Measuring The Refractive Index And Optical Path Length Effects Of Air Using Multiple-Pass Interferometry" by Henry A. Hill, Peter de Groot, and Frank C. Demarest filed Feb. 18, 1999. The contents of both applications are incorporated herein by reference. Servo control signals are generated by electronic controller, signal processor, and computer 200 from the error signal component of signal 168 and transmitted as a servo signal component of signal 168 to translator 164. Translator 164 controls the location and orientation of chuck stage 162 in one or two orthogonal directions and in one or two orthogonal planes of orientation, according to the requirements of an end use application, in response to the servo signal component of signal 168.

Next, the object material 112 is scanned in a combination of one or two orthogonal directions substantially parallel to the surface of object material 112 and in the spatial separation of the conducting element 28 from the adjacent surface of object material 112 according to the requirements of an end-use application. Measured arrays of signal values $[S_n]_1$, $[S_n]_2$, $[S_n]_3$, and $[S_n]_4$ and, if required by an end-use application, measured arrays of signal values $[S_n]_5$, $[S_n]_6$, $[S_n]_7$, and $[S_n]_8$ are obtained as a function of the scanned parameters and the amplitudes and phases of the respective interference cross terms between the complex amplitude of the respective near field return probe beam and of the respective complex amplitude of the reflected reference beam computed by electronic controller, signal processor, and computer 200.

Information acquired with apparatus of the first embodiment is differential in nature consequences of the presence of Mach-Zehnder interferometer 1000.

In addition, information acquired with apparatus of the first embodiment about object material 112 is acquired in the presence of a significantly reduced background signal. Sources of contributions to the background signal comprise the background return beam, a background produced by reflection and/or scattering of other beams associated with the measurement beam in the apparatus of the first embodiment, and corresponding beams associated with the transmitted reference beam. The background signal is significantly reduced first because the apparatus of the first embodiment comprises a confocal optical imaging/detecting system and second because of consequences of the presence of Mach-Zehnder interferometer 1000.

Mach-Zehnder interferometer 1000 is configured to generate two output beam components that have a small difference in directions of propagation and a relative phase shift of π. Mach-Zehnder interferometer 1000 comprises two non-polarizing beam splitters 100 and 102 and two mirrors 112C and 112D. One output beam component is produced by a portion of beam 36 incident on non-polarizing beamsplitter 100 being reflected as beam 36A1/36B1 comprising rays between rays 36A1 and 36B1. Beam 36A1/36B1 is reflected by mirror 112C, is incident on non-polarizing beam-splitter 102, and a portion thereof is transmitted as a first component of beam 37A/37B comprising rays between rays 37A and 37B. A second output beam component is produced by a second portion of beam 36 incident on non-polarizing beam-splitter 100 being transmitted as beam 36A5/36B5 comprising rays between rays 36A5 and 36B5. Beam 36A5/36B5 is reflected by mirror 112D, is incident on non-polarizing beam-splitter 102, and a portion thereof is reflected as a second component of beam 37A/37B.

The relative angular orientations of the beam-splitters and mirrors of Mach-Zehnder interferometer 1000 are adjusted so that the difference in directions of propagation of the first and second components of beam 37A/37B, represented by a vector, is parallel to the plane containing a pair of sub-wavelength apertures 30a and 30b, i.e. the plane of FIG. 1, and the angular difference in directions of propagation corresponds to a small angle $\delta\theta_1$. Mach-Zehnder interferometer 1000 is further adjusted so as to introduce a $\pi$ phase shift between the first and second components of beam 37A/37B. Angle $\delta\theta_1$ is chosen so that the first and second components of 37A/37B to images at pinhole array 114 are registered as shown in FIGS. 5a and 5b.

Information contained in the arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ is described in terms of symmetric and antisymmetric combinations of the components of return beam 36 from apertures 30a and 30b of a pair of sub-wavelength apertures. The amplitude distributions of the symmetric parts of the first and second components from beam 37A/37B and from the transmitted reflected reference beam 56 is illustrated graphically in FIG. 5a. Also shown in FIG. 5a is the sum of the amplitude distributions of the symmetric parts of the first and second components from beam 37A/37B. It is evident on inspection of the sum of the amplitude distributions of the symmetric parts of the first and second components from beam 37A/37B have significantly reduced contributions to both $(S_D)_n$, an intensity term, and to $(S_I)_n$, an interferometric cross term. Likewise, the sum of the amplitude distributions of the symmetric parts of the first and second components from beam 37A/37B have significantly reduced contributions to the arrays of signal value differences $[S_n]_1-[S_n]_2$ and $[S_n]_3-[S_n]_4$.

The significantly reduced contributions of the symmetric parts of the first and second components from beam 37A/37B to $(S_D)_n$ corresponds to a significantly reduced systematic error and a reduced statistical error due the background return beam. The significantly reduced contributions of the symmetric parts of the first and second components from beam 37A/37B to $(S_D)_n$ also translates into an operation of the first embodiment with an increased intensity of beam 25 without saturating a pixel of detector 116 as compared to that possible when the contributions of the symmetric parts of the first and second components from beam 37A/37B to $(S_D)_n$ are not significantly reduced.

Figure 5B:
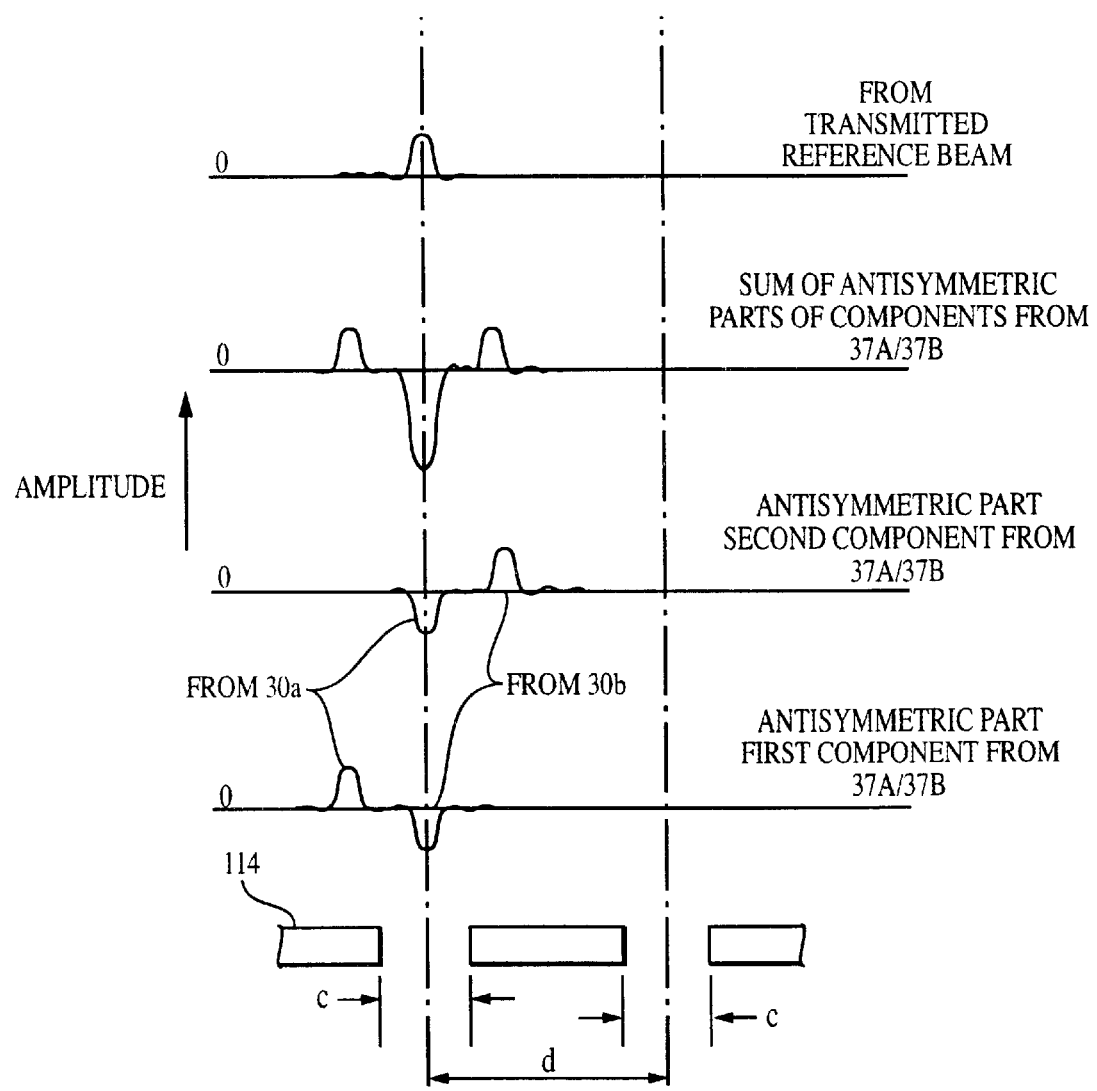
FIG. 5b illustrates, in schematic form, image plane 114 and amplitude distribution functions for antisymmetic components for images of a sub-wavelength apertures 30a and 30b at respective pinholes in image plane 114.

The amplitude distributions of the antisymmetric parts of the first and second components from beam 37A/37B and from the transmitted reflected reference beam 56 is illustrated graphically in FIG. 5b. Also shown in FIG. 5b is the sum of the amplitude distributions of the antisymmetric parts of the first and second components from beam 37A/37B. It is evident on inspection of the sum of the amplitude distributions of the antisymmetric parts that the antisymmetric parts of the first and second components from beam 37A/37B are have substantially relatively large contributions to both $(S_D)_n$, an intensity term, and to $(S_I)_n$, an interferometric cross term. Likewise, the sum of the amplitude distributions of the antisymmetric parts of the first and second components from beam 37A/37B have substantially relatively large contributions to the arrays of signal value differences $[S_n]_1-[S_n]_2$ and $[S_n]_3-[S_n]_4$.

The contribution of the amplitude of the background beam corresponds to a symmetric part of the first and second components from beam 37A/37B. The significantly reduced systematic error and a reduced statistical error due the background return beam is in addition to that achieved using a confocal microscopy system. Thus the reduction in systematic and statistical errors achieved in the first embodiment of the present invention is enhanced in relation to that achieved in prior-art confocal interference microscopy.

The pupil functions of the transmitted reference beam and return beam 38 may be apodized to improved the discrimination properties of the first embodiment with respect to the symmetric components of the components of beam 37A/37B without departing from the spirit and scope of the present invention.

The first embodiment can be configured as a number of variants using a pulsed source or sources and a continuous scanning mode, using a source of more than one wavelength, and different arrays of sub-wavelength apertures such as described in the previously mentioned U.S. Provisional Patent Applications entitled "Scanning Interferometric Near-Field Confocal Microscopy," "Multiple-Source Arrays With Optical Transmission Enhanced By Resonant Cavities," and "Scanning Interferometric Near-Field Confocal Microscopy With Background Amplitude Reduction And Compensation" filed Jul. 27, 2000 by Henry A. Hill without departing from the spirit and scope of the present invention. The contents of these provisional applications are incorporated herein by reference. The sub-wavelength apertures of the first embodiment may also be optical wave guides as described in previously mentioned U.S. Provisional Application entitled "Multiple-Source Arrays For Confocal And Near-Field Microscopy" filed Jul. 27, 2000 by Henry A. Hill and Kyle B. Ferrio, the contents of which are incorporated herein by reference.

Sub-wavelength apertures 30a and 30b may each comprise an optical fiber as described in Hill and Ferrio, op. cit. Also, sub-wavelength apertures 30a and 30b may correspond to sub-wavelength apertures associated with a single optical wave guide as described in Hill and Ferrio, op. cit. For the differential mode of operation of the first embodiment using a single optical wave guide with an associated pair of sub-wavelength apertures, the optical wave guide is configured to support two optical modes wherein one mode has a symmetric transverse field distribution and a second mode has an antisymmetric transverse field distribution for the same optical wavelength.

The differential interferometric near-field microscopy system of the first embodiment can be used for profiling a surface by looking for relative differences in surface properties at two positions separated by a distance $b_1$ and used to read optical data stored on an optical medium. In reading optical data, information obtained in the signal value differences $[S_n]_1-[S_n]_2$ and $[S_n]_3-[S_n]_4$ detects differences in the information state at two different information sites. Distance $b_1$ corresponds to an integral number N of center-to-center information site separations. Information stored based on integral number N can be read without loss of information by using a reading system based on the same integral number N. The integral number N is preferably greater than one in order to reduce the effects of couplings of elements of a pair of sub-wavelength apertures.

As a result of the significant reduction of systematic and statistical errors in the first embodiment, optical data information may be read from a single information data site by the first embodiment wherein the data information may have more than just states of "0" and "1".

The first embodiment may also be configured to detect changes in the state of polarization of the return beam relative to the input beam 25 without departing from the scope and spirit of the present invention. The plane of polarization of transmitted reference beam is rotated by 90° with a half-wave phase retardation plate and an analyzer is added so as to mix the corresponding beam 38. The differential mode of operation of the first embodiment of the present invention is then sensitive to any changes in the state of polarization of the return beam relative to the input beam 25 with reduced systematic and statistical errors.

The sum of the symmetric part of the first and second components from beam 37A/37B may be detected by detecting a second portion of beam 37 transmitted by beam-splitter 104 and a second portion of transmitted reference beam 56 reflected by beam-splitter 104. However, the background return beam is not compensated in this case. The background return beam can be compensated using the techniques disclosed in U.S. Patent Application entitled "Scanning Interferometric Near-Field Confocal Microscopy" by Henry A. Hill where the contents are incorporated herein by reference.

A first variant of the first embodiment of the present invention comprises the same elements as the first embodiment of the present invention as shown schematically in FIG. 1. The difference between the first variant of the first embodiment and the first embodiment is in the procedure used to acquire the measured arrays of signal values. In the first variant of the first embodiment, the amplitude $(|S_I|)_n$ and phase $(\phi)_n$ are determined using known heterodyne detection techniques or phase sensitive detection techniques for non-pulsed signals such as a digital Hilbert transform phase detector [see "Phase-locked loops: theory, design, and applications" 2nd ed. (McGraw-Hill, New York) 1993, by R. E. Best], a phase-locked loop [see R. E. Best, ibid.], a sliding window FFT [see *Digital Techniques for Wideband Receivers*, (Artech House, Boston) 1995, by J. Tsui using phase $\chi$ as the reference phase.

It is known for a function sampled uniformly in time that an implementation of a phase sensitive technique based on digital signal processing for acquisition of information on the function yields results based on a Chebyshev polynomial representation of the function [see H. A. Hill and R. T. Stebbins, *Astrophys. J.*, 200, p 484 (1975)]. Consider the example of phase $\chi$ being scanned about an offset $\chi_0$ so that $$\chi = \chi_0 + \Delta\chi \quad (3)$$

where $\Delta\chi$ is some function of time t. The scanning of $\chi$ generates components in elements of an array of signal values according to the Eqs. (2) and (3) expressed as $$(S_I)_n = (|S_I|\cos(\phi+\chi_0))_n \cos\Delta\chi - (|S_I|\sin(\phi+\chi_0))_n \sin\Delta\chi. \quad (4)$$

The amplitude array $[(|S_I|)_n]$ and phase array $[(\phi+\chi_0)_n]$ are then obtained by way of phase sensitive detection of the coefficient arrays of $\cos\Delta\chi$ and $\sin\Delta\chi$. The phase sensitive detection comprises multiplying $(|S_I|)_n$ by $\cos\Delta\chi$ and integrating $(|S_I|)_n \cos\Delta\chi$ with respect to time and multiplying $(|S_I|)_n$ by $\sin\Delta\chi$ and integrating $(|S_I|)_n \sin\Delta\chi$ with respect to time. For the case of $\Delta\chi$ being a sinusoidal function at an angular frequency $\omega_1$ with an amplitude 1, i.e., $$\Delta\chi = \cos\omega_1 t, \quad (5)$$

and $[(|S_I|)_n]$ sampled uniformly in time, the coefficient arrays of $\cos\Delta\chi$ and $\sin\Delta\chi$ can be expressed effectively as arrays of certain Chebyshev polynomial coefficients of $[(|S_I|)_n]$.

Elements of the arrays of certain Chebyshev polynomial coefficients can be expressed using known properties of Chebyshev polynomial as $$(|S_I|\cos(\phi+\chi_0))_n = \frac{4}{T[1+J_0(2)]}\int_{-T/2}^{T/2}(S_I)_n\cos\Delta\chi\,dt \quad (6)$$

$$= \frac{4}{[1+J_0(2)]}\int_{-1}^{1}\frac{(S_I)_n T_1(\Delta\chi)}{[1-(\Delta\chi)^2]^{1/2}}\,d\Delta\chi,$$

$$(|S_I|\sin(\phi+\chi_0))_n = -\frac{4}{[1-J_0(2)]}\int_{-T/2}^{T/2}(S_I)_n\sin\Delta\chi\,dt \quad (7)$$

$$= -\frac{4}{[1-J_0(2)]}\int_{-1}^{1}\frac{(S_I)_n V_1(\Delta\chi)}{[1-(\Delta\chi)^2]^{1/2}}\,d\Delta\chi$$

where $T=2\pi/\omega_1$, $T_1$ and $V_1$ are order 1 Chebyshev polynomials of type I and type II, respectively, and $J_0$ is the order 0 Bessel function of the first kind [see Section 13.3 of *Mathematical Methods for Physicists* by G. Arfken (Academic Press-New York) 1968].

The phase offset $\chi_0$ generally need not be determined other than meet the condition that it not be variable during a period of scanning object material 112. To compare results obtained at different times, it may be necessary to determine any change that may have occurred in $\chi_0$ during the period between the two different measurement times. Relative changes in $\chi_0$ can be determined for example by acquiring arrays of amplitudes $[(|S_I|)_n]$ and phases $[(\phi)_n]$ in array $[S_n]$ for object material 112 comprising an isotropic medium, e.g., fused silica, with a surface flat to requisite accuracy.

The first variant of the first embodiment has the advantage of a heterodyne detection system.

The remaining description of the first variant of the first embodiment is the same as corresponding portions of the description given for the first embodiment.

Figure 2:
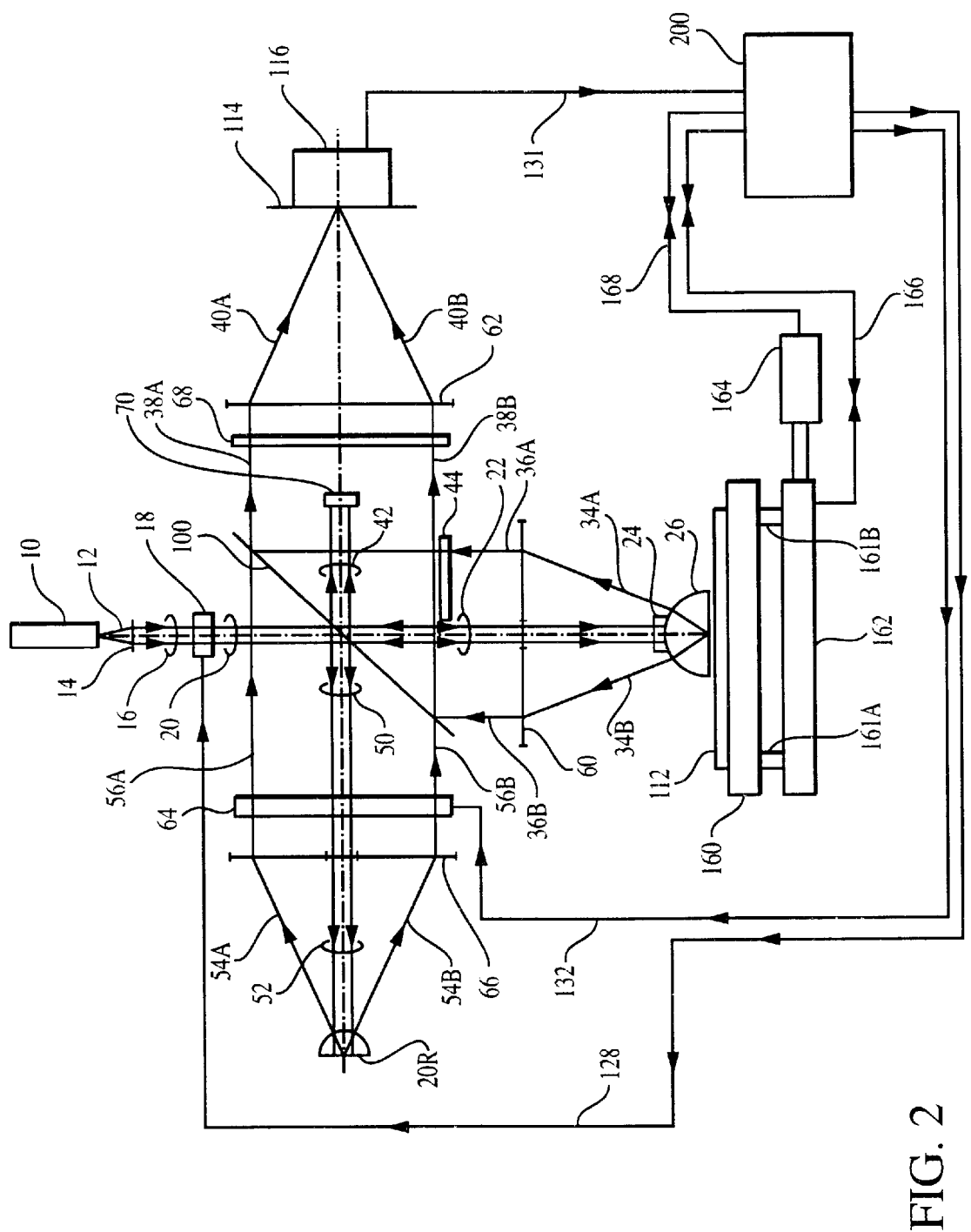
FIG. 2 illustrates, in schematic form, the second embodiment of the present invention.

Referring to the drawings, FIG. 2 depicts in schematic form the second embodiment of the present invention. Many of the elements are similar to corresponding ones in FIG. 1. As shown in FIG. 2, the second embodiment comprises an interferometer, a source 10, object material 112, object material chuck 160, chuck stage 162, translator 164, detector 116, and reference object 20R.

Input beam 20 is incident on a non-polarizing beam splitter 100 and a first portion thereof is transmitted as a measurement beam 22. A second portion of input beam 20 incident on beam splitter 100 is reflected as reference beam 50. Measurement beam 22 is transmitted through an aperture in lens 60 and incident on a lens assembly comprising lenses 24 and 26 having mask element 28 just as in FIGS. 1 and 4a of the first embodiment. The propagation of the measurement beam through the lens assembly and its interaction with mask element 28 and object 112 is the same as in the first embodiment.

Return beam 34 is collimated by lens 60 as return beam 36 shown as rays 36A and 36B in FIG. 2, wherein beam 36 comprise rays between rays 36A and 36B. A portion of beam 36 is incident on a wave front modifier 44, which in the presently described embodiment is a prism. The effects of prism 44 will be described in greater detail below. A portion of the measurement beam not incident on sub-wavelength apertures 30 is reflected as a return measurement beam. The return measurement beam exits lens 24 as a beam substantially parallel to measurement beam 22 and a portion thereof is reflected as a return measurement beam component of beam 42. Beam 42 is incident on and substantially occulted by stop 70.

Reference beam 50 is transmitted by a phase shifter 64, transmitted by an aperture in lens 66, incident on reference object 20R, and reflected as reflected reference beam 54 shown as rays 54A and 54B in FIG. 2 wherein beam 54 comprises rays between rays 54A and 54B. Beam 54 is collimated by lens 66 and transmitted by phase shifter 64 as a reflected reference beam 56 shown as rays 56A and 56B in FIG. 2, wherein beam 56 comprises rays in between rays 56A and 56B. Phase shifter 64 introduces a relative phase shift $\chi$ in the reflected reference beam 56 as a result of the two transits of reference beam 50 through phase shifter 64. The magnitude of phase shift $\chi$ is controlled by control signal 132 from electronic controller, signal processor, and computer 200.

Figure 4C:
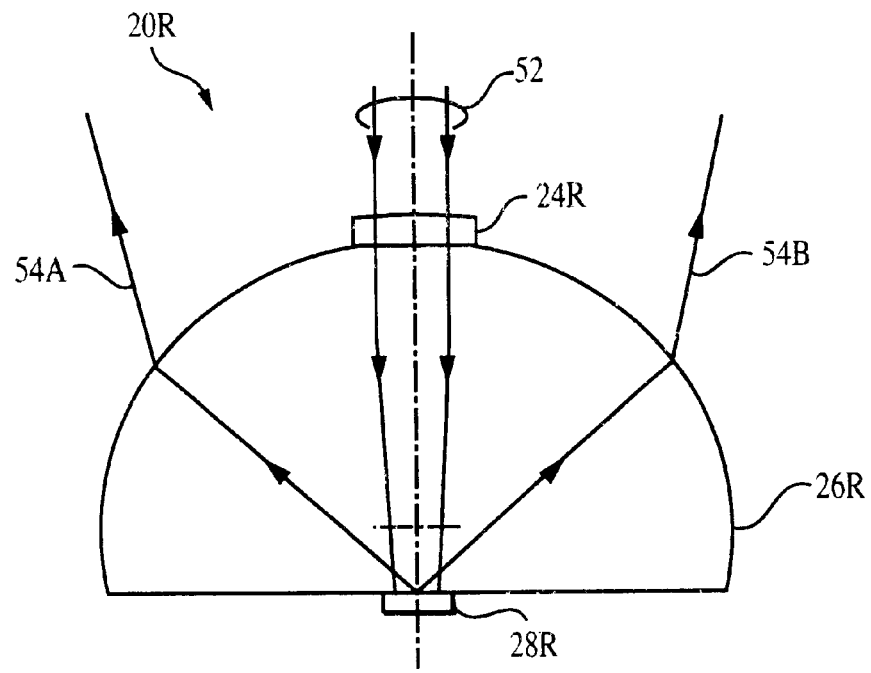
FIG. 4c illustrates, in schematic form, the reference object 20R comprising Amici type objective lens 26R and lens 24R, as used in the second embodiment.
Figure 4D:
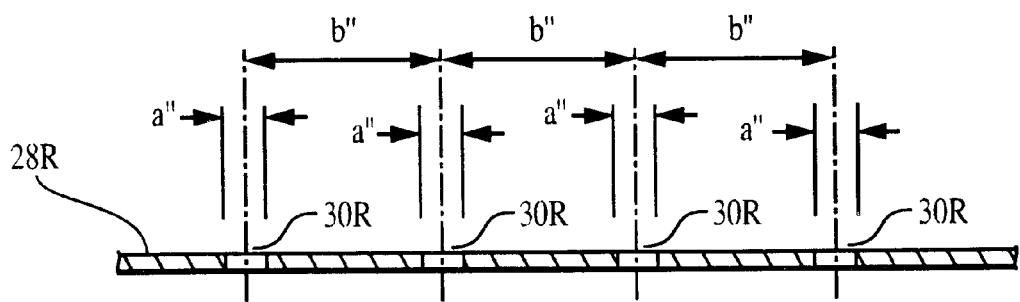
FIG. 4d illustrates, in schematic form, element 28 comprising reflecting elements 30R and 32R used in reference object 20R.

The propagation of reference beam 52 through reference object 20R is shown schematically in an expanded form in FIG. 4c. Reference object 20R is an Amici type objective lens. Reference beam 52 is focused by reference object 20R to a beam diameter at element 28R that encompasses an array of reflecting spots on element 28R. Element 28R in this second embodiments is identical that shown schematically in FIG. 4d and described in the first embodiment, except that in the second embodiment elements 30R are reflective, whereas in the first embodiment elements 30R are transmissive.

In general, in any of the embodiments described herein, it will be evident to those skilled in the art that the path of the reference beam could be configured such that the reference beam is either transmitted or reflected by a reference object 20R having an element which is complimentary to element 28R of the first embodiment without departing from the spirit and the scope of the present invention.

Referring again to FIG. 2, beam splitter 100 combines return measurement beam 36 with return reference beam 56 to form mixed beam 38 comprising rays 38A and 38B the corresponding optical axis. Optionally, a polarizer 68 may be positioned to receive mixed beam 38.

As in the first embodiment, beam 38 is incident on lens 62 and focused as mixed beam 40 shown as rays 40A and 40B in FIG. 2, wherein mixed beam 40 comprises rays between rays 40A and 40B. Mixed beam 40 is focused onto a pinhole plane 114 such that a pinhole in image plane 114 is a conjugate image of a pair of sub-wavelength apertures 30a and 30b. The remaining description is the same as in the first embodiment.

Wave front modifier 44 of the second embodiment of the present invention is a prism that introduces a $\pi$ phase and introduces an angle $\delta\theta_2$ between components of beam 38.

The consequences of such a prism to provide properties like those of the first embodiment with respect to making differential measurements with reduced systematic and statistical errors. Angle $\delta\theta_2$ is selected by a criterion corresponding to the criterion used in the selection of $\delta\theta_1$ of the first embodiment. Accordingly, prism 44 functions like the Mach-Zendar interferometer of the first embodiment to produce an output in the pinhole plane of the second embodiment like that of FIGS. 5a and 5b. Also the width of reflected reference beam 56 may be reduced for example so that the width of peaks in distributions at a pinhole are substantially the same for the reference beam components and the return beam components.

The remaining description of the second embodiment is the same as corresponding portions of the description given for the first embodiment of the present invention.

Figure 3:
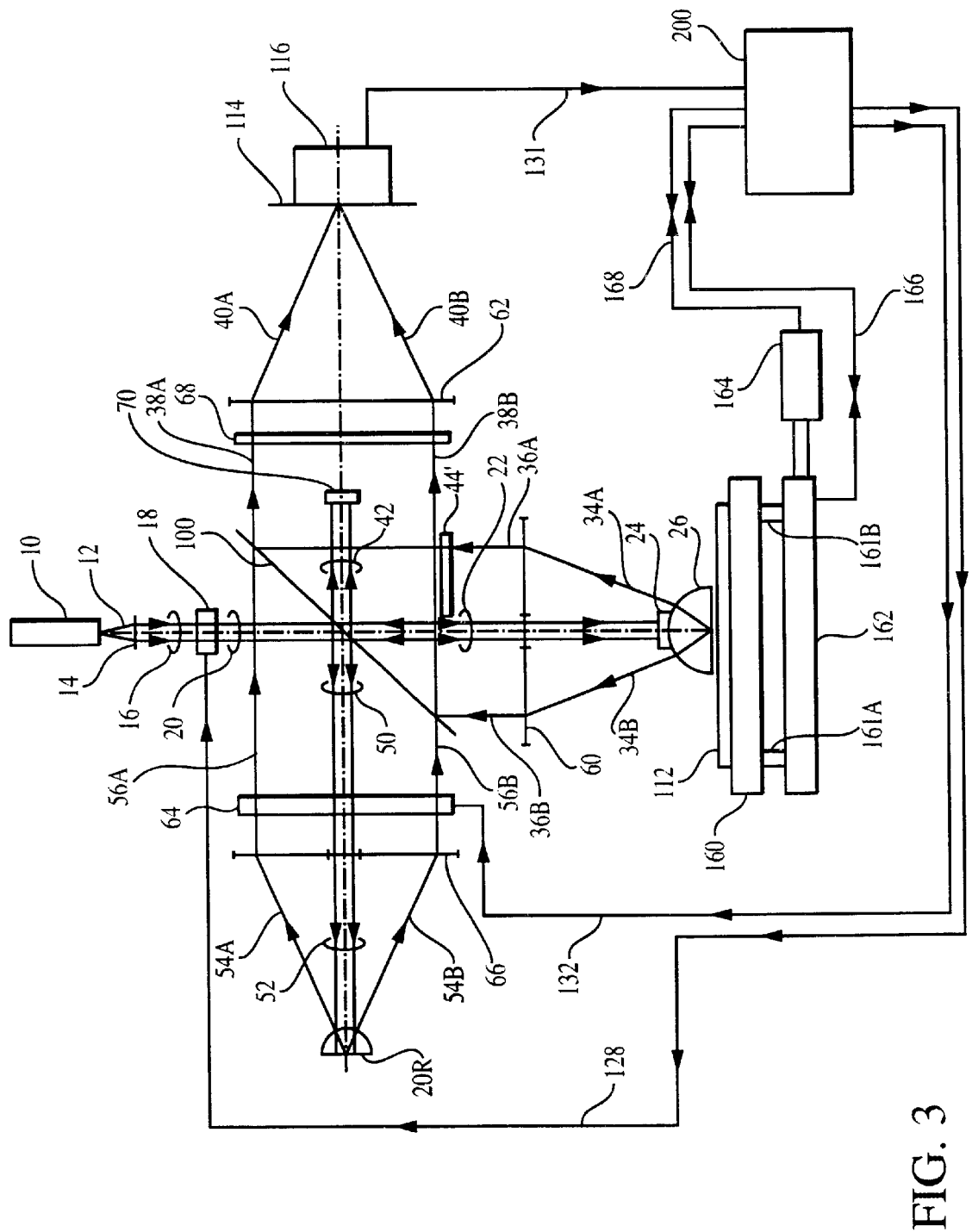
FIG. 3 illustrates, in schematic form, the third embodiment of the present invention.

Referring to the drawings, FIG. 3 depicts in schematic form the third embodiment of the present invention. The third embodiment is identical to the second embodiment, except that wave front modifier 44' is a phase retardation plate that imparts a pi phase shift to one half return measurement beam 36.

The description of properties of amplitude distributions at a pinhole of 114 for the third embodiment is similar to that of the first and second embodiments. In particular, the third embodiment has a high sensitivity for detecting the anti-symmetric contribution of a pair of apertures 30a and 30b and a reduced sensitivity for detecting the symmetric contribution of a pair of apertures 30a and 30b.

Generally, prism 44 and phase retardation plate 44' are both examples of a wave front modifier that is positioned in a pupil plane of the imaging system to produce a desired result in the pinhole plane. In particular, the wave front modifier can impart a phase and/or amplitude pattern to return beam 36 that redistributes the optical energy of each aperture pair image in the pinhole plane. In the second and third embodiments, for examples, the wave front modifier causes the anti-symmetric component of the radiation emerging from each aperture pair 30a and 30b to be occulted by the corresponding pinhole 114, whereas the symmetric component of the emerging radiation is preferentially passed by the pinhole. Such emerging radiation will include not only radiation emitted by the sample through the aperture pair, but also the radiation from the measurement beam scattered by the aperture pair. Other embodiments of the wave front modifier can achieve a similar result. For example, the wave front modifier can be a phase mask imparts a pi phase-shift to half of beam 36, either by bisecting the beam (as with plate 44'), or by using a phase mask that impart the pi phase-shift to different regions of beam 36 comprising half its transverse area in the pupil plane (e.g., a periodic alternating pattern of pi phase-shifts).

More generally, the wave front modifier may extend over some or all of return beam 36 and be a mask that imparts a variable phase and/amplitude (i.e., attenuation) pattern across the beam. Prism 44 is a particular example of this generalization in that it imparts a linear phase sweep to half of beam 36. In other embodiments, the properties of wave front modifier may be chosen to cause a selected component of the radiation emerging from each aperture pair 30a and 30b to be occulted by the corresponding pinhole 114 while preferentially passing another component. For example, the selected component may some superposition of the symmetric and anti-symmetric components of the radiation emerging from each aperture pair.

Similarly, the phase shift imparted by the Mach-Zendar interferometer of the first embodiment may be selected to cause a selected superposition of the symmetric and anti-symmetric components of the radiation emerging from each aperture pair from being absent in the pinhole plane.

Furthermore, in additional embodiments, it may be desirable to introduce a phase shift between the measurement beam portions radiated to the object by the apertures in each aperture pair. This will in turn effect the symmetry of the corresponding radiation emerging from each aperture pair upon detection and the corresponding passage through the pinhole array. Such phase shifts may be introduced to the radiated measurement beam portions by directing the measurement beam to contact array of aperture pairs at an angle to the normal of the mask array, such as is shown in FIG. 4a with respect to the measurement beam passing through lens 124A.

Further embodiments of the invention include adapting the systems described above to operate in a transmission mode. For example, the system may include a separate measurement beam source array positioned to receive the measurement beam, the measurement beam source array having an array of source aperture pairs positioned to radiate portions of the measurement beam to the object to cause the object to emit the radiation. Such measurement beam portions would cause the object go emit radiation towards a measurement beam detector array and subsequent optical detection system, which functions like the embodiments described above. Such a transmissive mode system is shown in, for example, FIG. 9 of PCT Publication WO 01/09662 A2 referenced further above.

Other aspects, advantages, and modifications are within the scope of the following claims.

What is claimed is:

1. A differential microscopy system for imaging an object, the system comprising:
    a mask comprising an array of aperture pairs, each aperture pair having a common separation, wherein during operation the mask is positioned adjacent the object to receive radiation emitted from the object; and
    an imaging system configured to image radiation emerging from the array of aperture pairs to produce a first conjugate image of the emerging radiation and an overlapping, second conjugate image of the emerging radiation laterally displaced relative to the first conjugate image by an amount corresponding to the aperture pair separation and a magnification of the imaging system,
    wherein a superposition of the first and second conjugate images define a set of aperture pair images each corresponding to a different one of the aperture pairs, and
    wherein the superposition suppresses a contribution to each aperture image of a selected component of the radiation emerging from each corresponding aperture pair.

2. The system of claim 1, wherein the selected component is an anti-symmetric component of the radiation emerging from each corresponding aperture pair.

3. The system of claim 1, wherein the imaging system is further configured to impart a selected phase shift between the first and second conjugate images, and the selected component corresponds to the selected phase shift.

4. The system of claim 3, wherein the selected component is a symmetric component of the radiation emerging from each corresponding aperture pair, and the selected phase shift is $\pi$ (modulo $2\pi$).

5. The system of claim 3, wherein the selected component is a superposition of symmetric and anti-symmetric components of the radiation emerging from each corresponding aperture pair.

6. The system of claim 1, wherein the imaging system comprises an interferometer for separating and recombining the radiation emerging through the multiple sets of aperture pairs into portions that produce the first and second conjugate images.

7. The system of claim 6, wherein the imaging system further comprises two collimating lenses defining a microscope and wherein the interferometer is positioned within the microscope.

8. The system of claim 7, wherein the interferometer is configured to recombine the portions that produce the first and second conjugate images within the microscope and introduce a difference in propagation directions between the recombined portions, wherein the difference in propagation directions produces the lateral displacement between the first and second conjugate images.

9. The system of claim 8, wherein the interferometer is further configured to introduce a relative phase shift between the recombined portions, and wherein the selected component is a superposition of symmetric and anti-symmetric components, the superposition being based on the relative phase shift.

10. The system of claim 1, wherein the imaging system comprises a prism positioned at a pupil plane of the imaging system, the prism positioned to contact a first portion of the imaged radiation, and not a second portion of the imaged radiation, and wherein the prism introduces a difference in propagation between the first and second portions to produce the laterally displaced first and second conjugate images.

11. The system of claim 10, wherein the imaging system comprises two collimating lenses defining a microscope and the pupil plane is positioned within the microscope.

12. The system of claim 10, wherein the prism is further configured to introduce a relative phase shift between the first and second portions, and wherein the selected component is a superposition of symmetric and anti-symmetric components, the superposition being based on the relative phase shift.

13. The system of claim 1, wherein the imaging system includes a pinhole array positioned in the conjugate image plane, the pinhole array having an array of pinholes each aligned with a corresponding aperture pair image.

14. The system of claim 13, where each pinhole in the pinhole array is sized to pass only a central portion of each corresponding aperture pair image.

15. A differential microscopy system for imaging an object, the system comprising:
    a mask comprising an array of aperture pairs, wherein during operation the mask is positioned adjacent the object to receive radiation emitted from the object; and
    an imaging system configured to image radiation emerging from the multiple sets of aperture pairs and produce a conjugate image of the emerging radiation, the conjugate image including an array of aperture pair images each corresponding to a different one of the aperture pairs,
    wherein the imaging system includes a pinhole array positioned in the conjugate image plane, the pinhole array having an array of pinholes each aligned with a corresponding aperture pair image,
    wherein the imaging system further includes a wave front modifier positioned in a pupil plane of the imaging system, and
    wherein the wave front modifier causes the conjugate image to suppress a selected component of the radiation emerging from each aperture pair from passing through the corresponding pinhole in the conjugate image plane.

16. The system of claim 15, where each pinhole in the pinhole array is sized to pass only a central portion of each corresponding aperture pair image.

17. The system of claim 15, wherein the wave front modifier is a phase mask that imparts one or more phase shifts to different regions of the incident radiation.

18. The system of claim 17, wherein the phase mask imparts a constant phase shift to the different regions of the incident radiation.

19. The system of claim 18, wherein the phase mask imparts a phase shift of $\pi$ (modulo $2\pi$) to half of the incident radiation relative to the other half of the incident radiation.

20. The system of claim 19, wherein the selected component is a symmetric component of the radiation emerging from each corresponding aperture pair.

21. The system of claim 19, wherein the phase mask is defined by a retardation plate positioned to bisect the radiation in the pupil plane, wherein the retardation plate has a thickness that imparts a constant $\pi$ (modulo $2\pi$) phase-shift relative to a similar thickness of air.

22. The system of claim 19, wherein the phase mask imparts a phase shift of $\pi$ (modulo $2\pi$) to alternating periodic regions of the incident radiation.

23. The system of claim 22, wherein the selected component is a symmetric component of the radiation emerging from each corresponding aperture pair.

24. The system of claim 17, wherein the phase mask imparts a linear phase ramp to a selected portion of the incident radiation.

25. The system of claim 24, wherein the phase mask is defined by a prism positioned to contact one-half of the radiation in the pupil plane and not the other half of the radiation in the pupil plane.

26. The system of claim 15, wherein the selected component is a symmetric component of the radiation emerging from each corresponding aperture pair.

27. The system of claim 15, wherein the selected component is a superposition of symmetric and anti-symmetric components of the radiation emerging from each corresponding aperture pair.

28. The system of claim 15, wherein the imaging system comprises two collimating lenses defining a microscope and the pupil plane is positioned within the microscope.

29. An interferometric optical microscopy system for imaging an object, the system comprising:
a measurement beam mask array having an array of aperture pairs positioned to receive radiation emitted from the object in response to a measurement beam, radiation emerging from the array of aperture pairs defining a measurement return beam;
a reference beam source array positioned to receive a reference beam, the reference beam source array comprising an array of elements each configured to radiate a portion of the reference beam, the radiated reference beam portions defining a reference return beam; and
imaging optics positioned to direct the measurement and reference return beams to the photo-detector and configured to produce overlapping conjugate images of the array of reference elements and the array of apertures pairs,
wherein the conjugate image for each aperture pair overlaps with the conjugate image of a corresponding reference element,
wherein the imaging optics include a pinhole array positioned in the conjugate image plane, the pinhole array having an array of pinholes each aligned with a corresponding aperture pair image, and
wherein the measurement and reference beams are derived from a common source.

30. The system of claim 29, where each pinhole in the pinhole array is sized to pass only a central portion of each corresponding aperture pair image.

31. The system of claim 29, further comprising a source for the measurement and reference beams.

32. The system of claim 31, wherein the source is configured to direct the measurement beam to the measurement beam mask array and each aperture in the measurement beam mask array is configured to radiate a portion of the measurement to the object to cause the object to emit the radiation.

33. The system of claim 32, wherein the source directs the measurement beam to contact the measurement mask array at an angle to a normal to the mask array, thereby introducing a phase shift between the measurement beam portions radiated to the object by the apertures in each aperture pair.

34. The system of claim 31, further comprising a measurement beam source array positioned to receive the measurement beam, the measurement beam source array having an array of source aperture pairs positioned to radiate portions of the measurement beam to the object to cause the object to emit the radiation.

35. The system of claim 34, wherein the source directs the measurement beam to contact the measurement beam source array at an angle to a normal to the measurement beam source array, thereby introducing a phase shift between the measurement beam portions radiated to the object by the source apertures in each source aperture pair.

36. The system of claim 29, further comprising
a multi-element photo-detector positioned to measure the radiation emerging through each pinhole, wherein the radiation emerging through each pinhole provides an interference signal indicative of a differential property between object locations corresponding to the apertures in each aperture pair; and
an electronic controller coupled to the photo-detector and configured to resolve the differential property across multiple regions of the object based on signals from the photo-detector.

* * * * *

UNITED STATES PATENT AND TRADEMARK OFFICE
CERTIFICATE OF CORRECTION

PATENT NO. : 6,775,009 B2
DATED : August 10, 2004
INVENTOR(S) : Henry A. Hill

It is certified that error appears in the above-identified patent and that said Letters Patent is hereby corrected as shown below:

<u>Title page,</u>
Item [57], ABSTRACT,
Line 15, replace "apertures" with -- aperture --

<u>Column 21,</u>
Line 43, replace "apertures" with -- aperture --

<u>Column 22,</u>
Line 1, insert -- : -- after "comprising"

Signed and Sealed this

Twenty-sixth Day of July, 2005

JON W. DUDAS
*Director of the United States Patent and Trademark Office*